United States Patent
Ortega et al.

(10) Patent No.: US 6,724,098 B2
(45) Date of Patent: Apr. 20, 2004

(54) GENERATOR SYSTEM WITH GAS TURBINE

(75) Inventors: Isabel Alvarez Ortega, Madrid (CH); Narindra N. Puri, Piscataway, NJ (US); Marco Suter, Rütihof (CH)

(73) Assignee: ABB Research LTD, Zurich (CH)

( * ) Notice: Subject to any disclaimer, the term of this patent is extended or adjusted under 35 U.S.C. 154(b) by 0 days.

(21) Appl. No.: 09/947,754

(22) Filed: Sep. 7, 2001

(65) Prior Publication Data

US 2002/0067042 A1 Jun. 6, 2002

(30) Foreign Application Priority Data

Sep. 14, 2000 (EP) .......................... 00810831

(51) Int. Cl.[7] .............................. F01D 15/10
(52) U.S. Cl. ................... 290/52; 290/2; 290/40 B
(58) Field of Search ................ 290/40 A, 40 B, 290/40 C, 40 F, 51, 52; 60/39.094

(56) References Cited

U.S. PATENT DOCUMENTS

| 5,148,043 A | * | 9/1992 | Hirata et al. ................ 307/66 |
| 5,332,959 A | * | 7/1994 | Malmquist et al. .......... 322/14 |
| 5,545,928 A | * | 8/1996 | Kotani ...................... 290/40 C |
| 6,274,945 B1 | * | 8/2001 | Gilbreth et al. ............. 290/52 |
| 6,281,595 B1 | * | 8/2001 | Sinha et al. .............. 290/40 A |
| 2002/0059791 A1 | * | 5/2002 | Willis et al. .............. 60/39.094 |
| 2002/0070557 A1 | * | 6/2002 | Gels ....................... 290/40 R |

FOREIGN PATENT DOCUMENTS

| EP | 0 901 218 | 3/1999 |
| EP | 0 963 035 | 12/1999 |
| JP | 06117275 | 4/1994 |
| WO | 99/32762 | 7/1999 |

* cited by examiner

Primary Examiner—Nicholas Ponomarenko

(57) ABSTRACT

In a generator system having a gas turbine (1) and a generator (2), which is driven by the gas turbine (1), an electricity supply network (5) is supplied from an energy reservoir (6) when the output of the gas turbine (1) is inadequate in the case of a load change. In order to overcome the inertia of the gas turbine (1), energy is additionally supplied from the energy reservoir (6) to the generator (2) which, acting as a motor, accelerates the gas turbine (1) until it at least has the output demanded by the network.

12 Claims, 1 Drawing Sheet

GENERATOR SYSTEM WITH GAS TURBINE

Cross Reference to Related Applications

This application claims priority under 35 U.S.C. §119 and/or 365 to 00810831.8 filed in Europe on Sep. 14, 2000.

FIELD OF INVENTION

The invention relates to a method for regulating a generator system and also relates to a generator system, [as respectively described in the preambles to claim 1 and claim 6] in particular a generator system having a gas turbine and an energy reservoir.

BACKGROUND OF THE INVENTION

Generator systems which employ "turbogenerators" are known for the generation of electricity. A turbogenerator has a small gas turbine, for example a microturbine, and an electrical generator/motor. In these systems, gas turbine and generator rotor are connected together by means of a simple shaft so that a change to the utilization of the capacity of the gas turbine has a direct effect on the generator output and, therefore, on the electricity generation. Such a turbogenerator is described in EP-A0'901'218. These turbogenerators are particularly suitable for supplying an isolated electricity supply network.

Gas turbines have relatively high inertia so that they can only achieve an output change of 5 kW per second. This, however, is not sufficient to deal with load changes when an isolated electricity supply network is being operated.

An energy reservoir is therefore employed in EP-A0'901'218; this is supplied by the gas turbine in normal operation and, in the case of an increase in load, supplies the network with the difference relative to the gas turbine output. In isolated network operation, furthermore, the gas turbine is started by means of the energy reservoir.

So that it can also cover large changes in load, the energy reservoir must be designed to be relatively large. This makes a substantial contribution to the costs of the installation and to its size. A further disadvantage is that the efficiency of the small output station is relatively poor during load changes because the turbine has a massively increased requirement for fuel.

SUMMARY OF THE INVENTION

The object of the invention is, therefore, to create a method of regulating a generator system and to create a generator system, which method and system obviate the disadvantages mentioned above.

This object is achieved by a method with the features of claim 1 and a generator system with the features of claim 6.

In the event of a change in load in a generator system driven by a gas turbine, the invention provides for an energy reservoir to be used not only to supply an energy difference to the network but also to supply energy to the generator. During load changes, therefore, the generator is employed as a motor for accelerating the gas turbine so that the latter can again itself supply the energy required as soon as possible.

This massively reduces the reaction time of the gas turbine. In this system, the energy reservoir has to supply less energy overall to the total system, i.e. to the as network and the generator, than energy reservoirs which only ensure a network-end supply of the energy difference. An energy reservoir with less storage capacity therefore suffices.

The generator system according to the invention has, furthermore, an increased efficiency because the energy for accelerating the turbine does not, or only to a small extent, originate from the fuel and the essential proportion is supplied in the form of electrical energy.

Further advantageous variants of the method and advantageous embodiments are given in the sub-claims.

BRIEF OF THE DRAWINGS

The subject matter of the invention is explained in more detail below using a preferred embodiment example, which is represented in the accompanying drawings. In these:

DETAILED DESCRIPTION OF THE INVENTION

Figure 1:
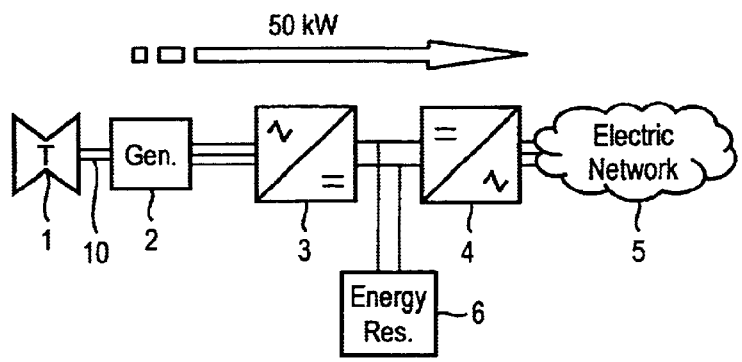
FIG. 1 shows a diagrammatic representation of a generator system with an energy flow for normal operation at constant load.

A generator system or a small output station is represented diagrammatically in FIG. 1. This preferably involves a turbogenerator system, such as is described at the beginning. The generator system has a gas turbine 1, preferably a microturbine. A generator 2 is connected to this gas turbine 1 by means of a shaft 10, so that a change in the rotational speed of the turbine 1 has a direct effect on the output of the generator 2. The generator 2 is connected by means of a generator-end rectifier 3 and a network-end inverter 4 to an electricity supply network 5, preferably an isolated network.

An energy reservoir 6 is connected in the direct current circuit between the rectifier 3 and the inverter 4. All known reservoirs—such, for example, as electrical reservoirs such as batteries or flywheels—can be used as the energy reservoir 6.

FIG. 1 represents a condition in normal operation of the generator system at constant load. The turbine 1 rotates at constant speed so that the generator 2 supplies a constant output to the electricity supply network 5. Without anticipation of general applicability, it is assumed in this example that a load which requires an output of 50 kW is connected to the network 5. The turbine is started by known means, which will not be considered here. During this operation, the generator-end inverter 4 is preferably used as a starting inverter. In particular, the turbine can be started by means of the energy reservoir 6 in the case of an isolated network or by taking electrical energy from the mains in the case of a public electricity supply network.

Figure 2:
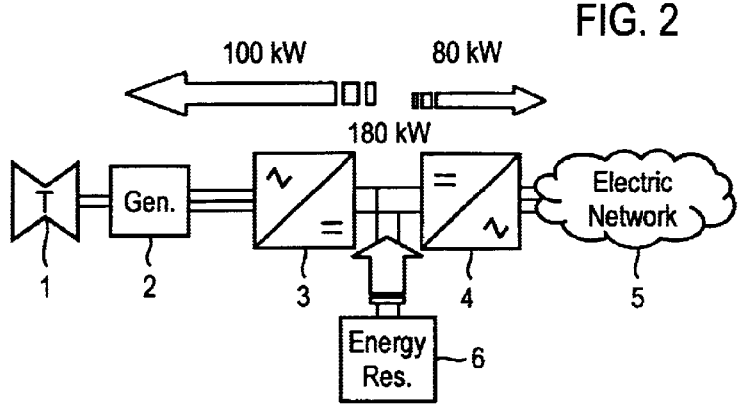
FIG. 2 shows the energy flow in the generator system according to FIG. 1 after a load step.

FIG. 2 represents the situation which occurs in the case of a load step. This situation can occur in an isolated network or in a normal network under isolated conditions, i.e. when a main electricity supply has failed and the generator system forms an emergency or additional supply system. It is assured, as an example, that the network-end output requirement has been increased to 80 kW. The 30 kW difference cannot be supplied by the turbine 1 immediately. According to the invention, therefore, the total network-end electricity requirement is covered by the energy reservoir 6. In addition, the energy reservoir 6 supplies energy to the generator 2, which acts as a motor 2 and accelerates the turbine 1 so that the latter can cover the increased electricity requirement of the network 5 as rapidly as possible. During this period, the fuel supply to the turbine 1 is also preferably creased. In the example of FIG. 2, the energy reservoir supplies 100 kW of output to the generator 2 so that a total output of 180 kW is drawn from the energy reservoir. An acceleration generated electrically by means of the generator 2 used as a motor has an efficiency of approximately 90% and the efficiency is only approximately 20% in the case of an acceleration generated by an increased fuel supply. The employment of the energy reservoir 6 therefore leads to the acceleration of the turbine 1 taking place by up to 120 times more rapidly than it would be by means of fuel supply alone. Although an increased output from the energy reservoir 6 is required because it must supply both the network 5 and the generator/motor 2, the period in which the gas turbine 1 cannot cover the energy requirement alone is massively shortened and the energy requirement is therefore massively reduced. The energy reservoir 6 can therefore be designed to be smaller than the reservoir used in the prior art. In the method according to the invention, for example, a load change from 20 kW to 100 kW requires a total of 280 kj of energy, which is drawn from the energy reservoir. In this arrangement, the energy withdrawal takes place over a period of, at least approximately, 0.8 seconds, an output of 200 kW being demanded on the average. In a method according to the prior art, in which the energy reservoir only supplies that part of the energy requirement which is not available from the turbine, a total of 640 kJ is drawn from the energy reservoir, the energy reservoir being in use for 16 seconds and supplying 40 kWh on the average.

Figure 3:
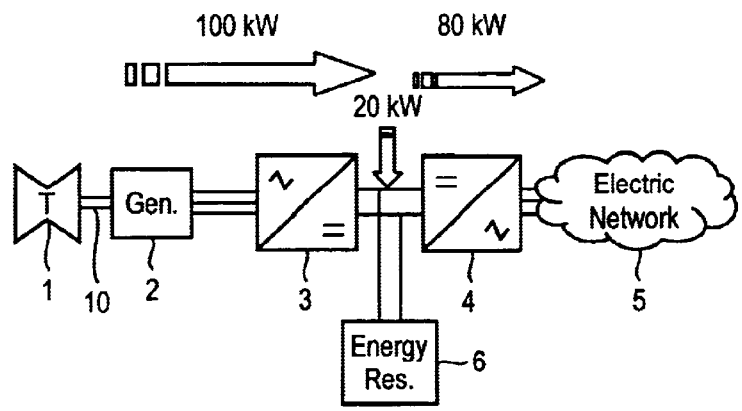
FIG. 3 shows the energy flow after acceleration of the turbine has taken place.
Figure 4:
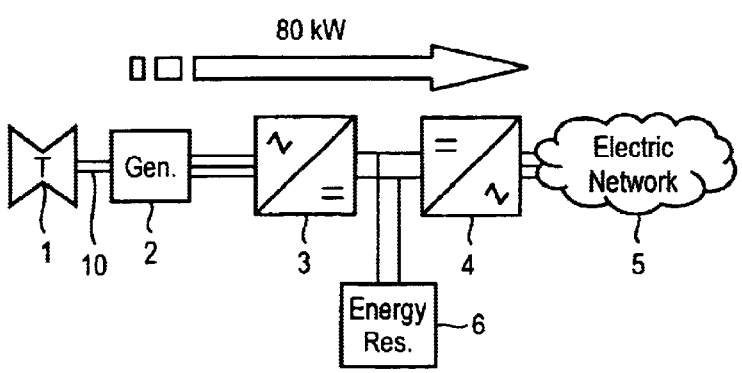
FIG. 4 shows the energy flow after the energy reservoir has been charged.

Once the turbine 3 has reached the necessary rotational speed and therefore the initial output, the energy supply from the energy reservoir 6 to the electricity supply network 5 is interrupted and the energy is again drawn from the turbine 1. This situation is represented in FIG. 3, the turbine 1 being accelerated beyond the necessary value so that it has a larger output than is required at the network end. The surplus energy is supplied to the energy reservoir 6 in order to top up the latter. In this example, the instantaneous output of the turbine 1 is 100 kW, so that 20 kW are supplied to the energy reservoir. In FIG. 4, a new normal condition at constant load has been set, in which the energy required by the network is supplied exclusively by the turbine 1; in the example represented here, the energy is 80 kWh.

The control of the energy flow and the acceleration of the gas turbine takes place by means of control systems, such as are known in the prior art. The control type, according to the invention, of the generator system and the generator system, according to the invention, permit a massive shortening of the reaction time of the gas turbine and, therefore, the energy reservoir can be minimized.

LIST OF DESIGNATIONS

1 Gas turbine
10 Shaft
2 Generator
3 Rectifier
4 Network-end inverter
5 Electricity supply network
6 Energy reservoir

What is claimed is:

1. A method of supply energy with a generator system, the generator system having an energy reservoir and a generator driven by a gas turbine, the method comprising:
    supplying energy to the energy reservoir by the gas turbine when an output of the gas turbine is sufficient for an energy demand of the electricity supply network, and
    when a shortfall exists between the output of the gas turbine and the energy demand of the network, supplying the shortfall from the energy reservoir to the network and supplying energy from the energy reservoir energy to the generator to accelerate the gas turbine by operating the generator as a motor.

2. The method as claimed in claim 1, comprising supplying energy to the network exclusively from the energy reservoir when the output of the gas turbine is inadequate to supply the network.

3. The as claimed in claim 1, comprising accelerating the gas turbine to produce a higher output than necessary for supplying the network, and supplying surplus energy produced by the gas turbine to the energy reservoir.

4. The method as claimed in claim 1, comprising increasing an amount of fuel supplied to the gas turbine to additionally accelerate the gas turbine.

5. The method as claimed in claim 1, wherein the energy reservoir is a battery or a flywheel.

6. A generator system comprising;
    a gas turbine,
    a generator driven by the gas turbine, a rectifier,
    an inverter for connecting the generator to an electricity supply network, and
    an energy reservoir configured to supply energy to the electricity supply network and to accelerate the turbine when an output of the gas turbine is inadequate, the energy reservoir supplying energy to the generator and the generator operating as a motor to accelerate the gas turbine when the output of the gas turbine is inadequate for the electricity supply network.

7. The generator system as claimed in claim 6, wherein the energy reservoir is arranged between rectifier and inverter.

8. The generator system as claimed in claim 6, wherein the gas turbine is directly connected to a rotor of the generator by means of a shaft.

9. The generator system as claimed in claim 6, wherein the energy reservoir can be topped up by means of the generator.

10. The generator system as claimed in claim 6, wherein the energy reservoir is a battery or a flywheel.

11. The method as claimed in claim 1, comprising supplying energy from the energy reservoir to the generator and to the network when the output of the gas turbine is inadequate to supply the network.

12. The generator system as claimed in claim 6, the energy reservoir being configured to supply energy from the energy reservoir to the generator and to the network during normal operation when the output of the gas turbine is inadequate to supply the network.

* * * * *